United States Patent
Boutaghou

(10) Patent No.: US 6,452,752 B1
(45) Date of Patent: *Sep. 17, 2002

(54) SLIDER FOR DISC STORAGE SYSTEM

(75) Inventor: Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/704,155

(22) Filed: Nov. 1, 2000

Related U.S. Application Data

(62) Division of application No. 09/043,324, filed as application No. PCT/US98/05628 on Mar. 20, 1998, now Pat. No. 6,160,683
(60) Provisional application No. 60/055,740, filed on Aug. 15, 1997.

(51) Int. Cl.[7] .......................... G11B 21/21; G11B 17/32; G11B 5/60
(52) U.S. Cl. .................................................. 360/237.1
(58) Field of Search ...................................... 360/237.1

(56) References Cited

U.S. PATENT DOCUMENTS

| | | | |
|---|---|---|---|
| 3,754,104 A | 8/1973 | Piper et al. ............... 179/100.2 |
| 4,034,412 A | 7/1977 | Smith ......................... 360/103 |
| 4,327,387 A | 4/1982 | Plotto ......................... 360/103 |
| 4,692,832 A | 9/1987 | Bandara et al. ............. 360/137 |
| 4,757,402 A | 7/1988 | Mo ............................. 360/103 |
| 4,853,810 A | 8/1989 | Pohl et al. ................... 360/103 |
| 4,901,185 A | 2/1990 | Kubo et al. ................. 360/104 |
| 5,010,429 A | 4/1991 | Taguchi et al. ............. 360/103 |
| 5,012,572 A | 5/1991 | Matsuzawa et al. ......... 29/603 |
| 5,020,213 A | 6/1991 | Aronoff et al. ............... 29/603 |
| 5,034,828 A | 7/1991 | Ananth et al. ............... 360/75 |
| 5,052,099 A | 10/1991 | Taguchi et al. ............. 29/603 |

(List continued on next page.)

FOREIGN PATENT DOCUMENTS

| | | |
|---|---|---|
| EP | 0 442 660 A2 | 8/1991 |
| EP | 0 736 859 A2 * | 10/1996 |
| JP | 54-23517 | 2/1979 |
| JP | 56-107363 | 8/1981 |
| JP | 58-66995 | 4/1983 |
| JP | 59-193580 | 11/1984 |
| JP | 1-294283 * | 11/1989 |
| JP | 4-28070 * | 1/1992 |

(List continued on next page.)

OTHER PUBLICATIONS

Technical Disclosure Bulletin, "Magnetic Disk Storage System With Structured Magnetic Head Slider", by IBM Corp., vol. 27, No. 10A, (Mar. 1985) pp. 5820–5821.

(List continued on next page.)

Primary Examiner—William Klimowicz
(74) Attorney, Agent, or Firm—Westman, Champlin & Kelly, P.A.

(57) ABSTRACT

A storage device for storing information includes a disc storage medium having a disc surface. An armature is positioned over the disc surface and carries a head proximate the disc surface. Transducing circuitry is coupled to the head for reading and writing information onto the disc surface. A slider is coupled to the armature near an end of the armature for carrying the head and is adapted to position the transducing head proximate the disc surface. The slider includes an interface surface facing the disc surface having an air bearing region adapted to form an air bearing with the disc surface and having a contact pad extending from the air bearing region.

13 Claims, 2 Drawing Sheets

U.S. PATENT DOCUMENTS

| | | | |
|---|---|---|---|
| 5,063,712 A | 11/1991 | Hamilton et al. | 51/67 |
| 5,067,037 A | 11/1991 | Ananth et al. | 360/103 |
| 5,079,657 A | 1/1992 | Aronoff et al. | 360/103 |
| 5,162,073 A | 11/1992 | Aronoff et al. | 156/625 |
| 5,200,867 A | 4/1993 | Albrecht et al. | 360/103 |
| 5,202,803 A | 4/1993 | Albrecht et al. | 360/97.02 |
| 5,267,104 A | 11/1993 | Albrecht et al. | 360/97.02 |
| 5,285,337 A | 2/1994 | Best et al. | 360/97.02 |
| 5,323,282 A | 6/1994 | Kanai et al. | 360/103 |
| 5,345,353 A | 9/1994 | Krantz et al. | 360/103 |
| 5,374,463 A | 12/1994 | Bethune et al. | 428/64 |
| 5,386,666 A | 2/1995 | Cole | 451/5 |
| 5,388,020 A | 2/1995 | Nakamura et al. | 360/135 |
| 5,396,386 A | 3/1995 | Bolasna et al. | 360/103 |
| 5,396,387 A | 3/1995 | Murray | 360/103 |
| 5,418,667 A | 5/1995 | Best et al. | 360/103 |
| 5,420,735 A | 5/1995 | Haines | 360/103 |
| 5,424,888 A | 6/1995 | Hendriks et al. | 360/103 |
| 5,490,027 A | 2/1996 | Hamilton et al. | 360/104 |
| 5,499,149 A * | 3/1996 | Dovek | 360/103 |
| 5,508,861 A | 4/1996 | Ananth et al. | 360/103 |
| 5,515,219 A | 5/1996 | Ihrke et al. | 360/103 |
| 5,526,204 A | 6/1996 | French et al. | 360/97.02 |
| 5,537,273 A | 7/1996 | Hendriks et al. | 360/103 |
| 5,550,691 A | 8/1996 | Hamiton | 360/103 |
| 5,550,693 A | 8/1996 | Hendriks et al. | 360/103 |
| 5,550,696 A | 8/1996 | Nguyen | 360/135 |
| 5,557,488 A | 9/1996 | Hamilton et al. | 360/104 |
| 5,569,506 A | 10/1996 | Jahnes et al. | 428/65.3 |
| 5,572,386 A | 11/1996 | Ananth et al. | 360/103 |
| 5,612,838 A | 3/1997 | Smith et al. | 360/102 |
| 5,625,512 A | 4/1997 | Smith | 360/103 |
| 5,626,941 A | 5/1997 | Ouano | 428/141 |
| 5,742,449 A | 4/1998 | Gregory et al. | 360/97.02 |
| 5,991,120 A * | 11/1999 | Sato | 360/104 |
| 6,128,163 A * | 10/2000 | Haddock et al. | 360/237.1 |
| 6,160,683 A * | 12/2000 | Boutaghou | 360/237.1 |
| 6,226,151 B1 * | 5/2001 | Haddock | 360/236.6 |
| 6,243,234 B1 * | 6/2001 | Haddock et al. | 360/237.1 |

FOREIGN PATENT DOCUMENTS

| | | | |
|---|---|---|---|
| JP | 4-245054 | | 9/1992 |
| JP | 5-74090 | | 3/1993 |
| JP | 7-85623 | * | 3/1995 |
| JP | 7-334958 | | 12/1995 |
| JP | 8-69674 | * | 3/1996 |
| JP | 08-069674 | | 3/1996 |
| JP | 8-203054 | | 8/1996 |
| JP | 08-212740 | | 8/1996 |
| JP | 8-227568 | * | 9/1996 |
| JP | 8-279132 | | 10/1996 |
| JP | 08-287440 | | 11/1996 |
| JP | 10-49850 | * | 2/1998 |
| WO | 98/00841 | * | 1/1998 |

OTHER PUBLICATIONS

"Stiction Free Slider for the Smooth Surface Disk", by Y. Kasamatsu et al., *IEEE Transactions on Magnetics*, vol. 31, No. 6, (Nov. 1995), pp. 2961–2963.

"A Stiction Model for a Head–Disk Interface of a Rigid Disk Drive", by J. Gui et al., *J. Appl. Phys.*, vol. 78, No. 6, (Sep. 15, 1995), pp. 4206–4217.

"A Model for Mechanical Seals with Regular Microsurface Structure", by I. Etsion et al., *Tribology Transactions*, vol. 39, (1996), pp. 677–683.

"Increasing Mechanical Seals Life With Laser–Textured Seal Faces", by G. Halperin et al., *Surface Surtech Technologies ltd.*, (Sep. 1997), pp. 1–12.

* cited by examiner

SLIDER FOR DISC STORAGE SYSTEM

The present invention is a Divisional application of U.S. Ser. No. 09/043,324, filed Mar. 20, 1998, now U.S. Pat. No. 6,160,683, and entitled SLIDER FOR DISC STORAGE SYSTEM, which is a 371 of PCT/US98/05628, filed Mar. 20, 1998; and claims priority to Provisional Application Ser. No. 60/055,740, filed Aug. 15, 1997 and entitled DESIGN STRATEGY FOR CONTACT RECORDING OF 30S AND SUB 30S.

BACKGROUND OF THE INVENTION

The present invention relates to disc storage systems of the type used to store information. More specifically, the invention relates to the interface between slider and a surface of a storage disc.

Magnetic disc drives are used to store magnetically encoded information. As the magnetic disc spins, a transducing head "flies" over the surface of the disc. The transducing head is used to sense magnetic fields from the disc surface during readback of information, and to generate magnetic fields which are impressed onto the surface of the disc during writing of information. As the disc spins, the transducing head is supported by an "air bearing" which is formed between the disc surface and an air bearing slider of the transducer head assembly. The slider body has aerodynamic properties which provide a lifting force.

It is known that improved magnetic interaction between the disc surface and the transducing head can be achieved by reducing the spacing between the head slider and the disc surface. However, as the spacing between slider and disc is reduced, it becomes critical that the fly height be accurately maintained. If the slider should dip slightly, it will touch the surface of the disc and potentially damage the surface. This is particularly problematic with magnetoresistive or magneto-optic recording heads in which contact with an asperity on the disc surface can generate an error in the readback signal.

One technique for achieving very close spacing between the transducing head and the disc surface is described in U.S. Pat. No. 5,550,691 which issued Aug. 27, 1996 to Hamilton and is entitled "SIZE-INDEPENDENT, RIGID-DISK, MAGNETIC, DIGITAL-INFORMATION STORAGE SYSTEM WITH LOCALIZED READ/WRITE ENHANCEMENTS. The Hamilton reference describes a slider for contact recording in which the surface of the slider is dragged across the disc surface.

SUMMARY OF THE INVENTION

A storage device for storing information includes a disc storage medium having a disc surface. An armature is positioned over the disc surface and carries a magnetoresistive or a magneto-optic head proximate the disc surface. Transducing circuitry is coupled to the head for reading and writing information onto the disc surface. The slider is coupled to the armature near an end of the armature for carrying the head and is adapted to position the head proximate the disc surface. The slider includes an interface surface facing the disc surface having an air bearing region adapted to form an air bearing with the disc surface and having at least one contact pad extending from the air bearing region for contact recording. The air bearing provides an opposed lifting force which, when combined with the contact force on the pad, is substantially equal to the preload force.

In one aspect of the invention a sacrificial wear layer is provided on the at least one contact pad. In another aspect of the invention, the contact pad has a height which is at equilibrium with the air bearing during operation of the disc whereby the air bearing forms a shock absorbing cushion for the slider.

DETAILED DESCRIPTION OF THE PREFERRED EMBODIMENTS

The present invention provides a new design for a slider for use with a rotating disc storage medium. U.S. Pat. No. 5,550,691, issued Aug. 27, 1996 to Hamilton shows one prior art technique in which a slider is dragged across the disc surface. The Hamilton patent describes a slider having "feet" which are constructed of a hardened material. A transducing head is embedded within the one of the feet. The load placed on the transducing head by the armature is very low and the slider surface is designed to wear at a very low rate. However, the design is particularly susceptible to vibrations or other impacts which can cause the slider to crash against the disc surface. Further, the design set forth in the Hamilton patent is for a vertical recording device and is not suited for implementation in horizontal recording systems such as those that are currently used with magnetoresistive transducing elements. Further still, impact with an asperity will cause an error in readback from the magnetoresistive head.

The present invention includes a slider for use with a disc storage medium which includes an air bearing (or a "squeeze film") to achieve a number of advantages over the prior art. The design allows an equilibrium to be reached between the fly height, the preload force and the pad height. This is achieved through wear of the pad. Advantages include a reduction in the sensitivity of the slider to external vibrations or to contact induced excitation. The additional air bearing provides a damping function to vibrations as the slider moves across the disc surface. A slider in accordance with the present invention includes at least one protruding pad which extends from an air bearing surface of the slider.

Figure 1:
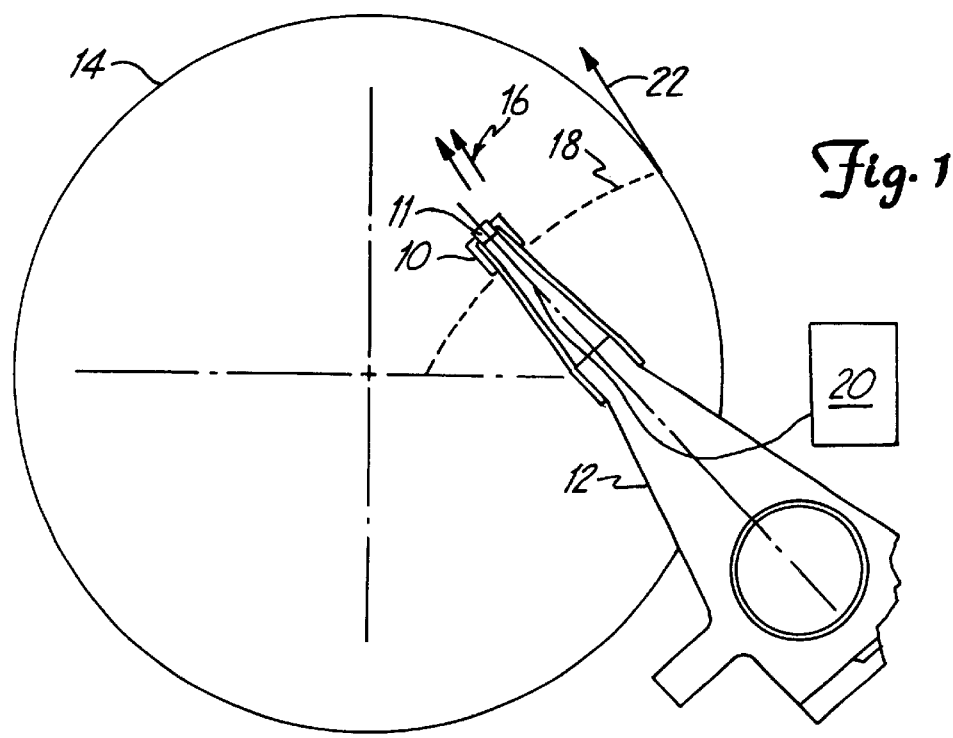
FIG. 1 is a top plan view of a disc storage system having a slider in accordance with the present invention.

FIG. 1 is a top plan view which illustrates a slider 10 supported by gimbal 11 over a disc 14. Gimbal 11 is secured to arm 12. Arm 12 positions slider 10 over individual data tracks on disc 14 (not shown) along an arc 18. As disc 14 rotates, it generates wind or air flow in the direction shown by arrows 16 (wind 16). Wind 16 is approximately parallel to the tangential velocity of the disc as indicated by arrow 22. Wind 16 cooperates with slider 10 to produce lift which pushes slider 10 away from disc 14. Typically, gimbal 11 is a resilient spring that allows slider 10 to follow the topography of disc 14. Gimbal 11 includes a dimple (not shown) that is in point contact with arm 12. The dimple provides a pivot about which slider 10 can pitch and roll following the topography of disc 14. Transducing circuitry couples to a head 50 (magnetoresistive or magneto-optic) on slider 10 for reading and writing information on disc 14. The elements described to this point are generally conventional in the design in disc drives.

Figure 2:
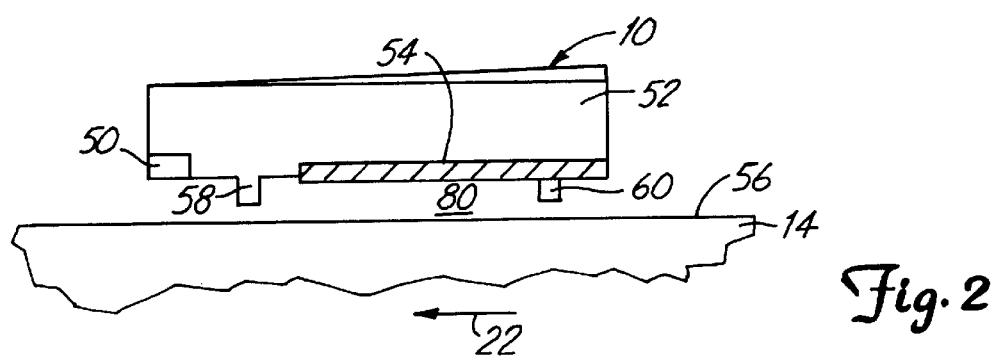
FIG. 2 is a side plan view of a slider in accordance with the present invention.

FIG. 2 is a side plan view of slider 10 in accordance with the present invention. Slider 10 includes magnetoresistive or magneto-optic element 50 positioned on a trailing edge of slider 10 which may be any type of transducing element such as a magnetoresistive head or-magneto-optical element, etc. Slider 10 also includes main body portion 52 having air bearing surface 54 carried thereon which generally faces surface 56 of disc 14. Slider 10 carries contact or wear pads 58 and 60 in accordance with the invention.

Figure 3:
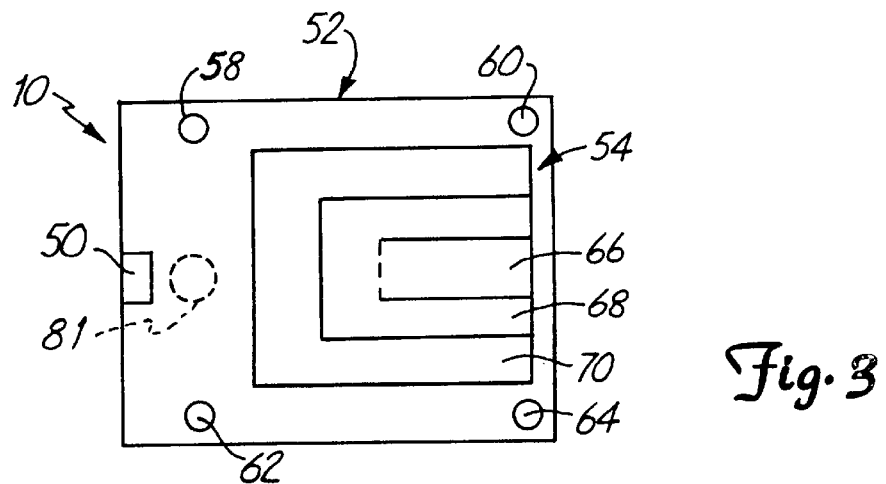
FIG. 3 is a bottom plan view of the slider of FIG. 2.

FIG. 3 is a bottom plan view of slider 10 which shows wear pads 62 and 64 in addition to pads 58 and 60. Additionally, FIG. 3 shows air bearing surface 54 in greater detail. In the example shown, air bearing surface 54 is a multi-step air bearing surface having steps 66, 68 and 70 and is designed for maximum damping effectiveness during operation. However, air bearing surface 54 is shown generally in schematic form and any type of air bearing surface 54 may be employed as the present invention is not limited to the particular embodiment shown. Additionally, any number of pads may be used and their particular shape may be changed as desired. In one preferred embodiment, a single pad 81 may be used and positioned slightly in front of head 50. In one preferred embodiment, pads 58, 60, 62 and 64 are formed of (or coated with) a hard material such as diamond-like carbon (DLC). The air bearing surface 54 may be designed to provide net lift or no net lift, as desired, in order to achieve a given nominal separation which is guaranteed by the height of contact pads 58–64.

The present invention provides a design in which there is an equilibrium reached between the air bearing, the preload force and the pad height. This ensures that the magnetoresistive head flies as close as possible to the disc without contacting asperities. Benefits related to an air bearing surface include damping which is very useful when the disc drive system is exposed to external shocks. Such shocks are particularly problematic for lap top or portable computers. Furthermore, the air bearing surface 54 can be designed such that the resultant air bearing shown generally at 80 in FIG. 2 will start to provide lift and pads 58–64 begin to wear. If the air bearing includes a negative air bearing section, it may be desirable to saturate the negative air bearing section during initial operation such that when the pads are wearing, the positive portion of the air bearing surface provides additional lift to thereby provide a positive clearance of the air bearing surface. Other design strategies can be adopted including using a negative net suction after a wear-in period to thereby provide more effective damping.

Figure 4:
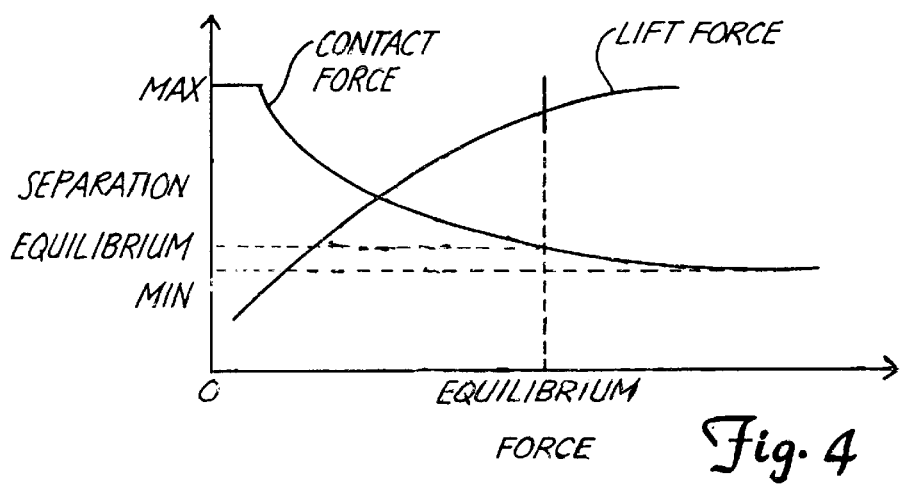
FIG. 4 is a graph of separation distance between a slider and a disc surface versus lift provided by the slider.

The lift force of the present invention can be designed to follow a simple graph such as that shown in FIG. 4. FIG. 4 shows the relationship between the separation of slider 10 from disc surface 56, the lift force provided by the air bearing surface 54 due to the air bearing 80 and the contact force between the pads and the disc surface 56 due to the preload lift and any other effects. The sum of the lift force and the contact force equals the preload force on the slider. The interface can be designed so that as the pads 58–64 wear in, the lift force balances the existing contact force and thereby transitions to a "flying" interface. An intermediate configuration is also possible in which the slider 10 is in elastic contact with disc surface 56 after an initial wear period.

Figure 5:
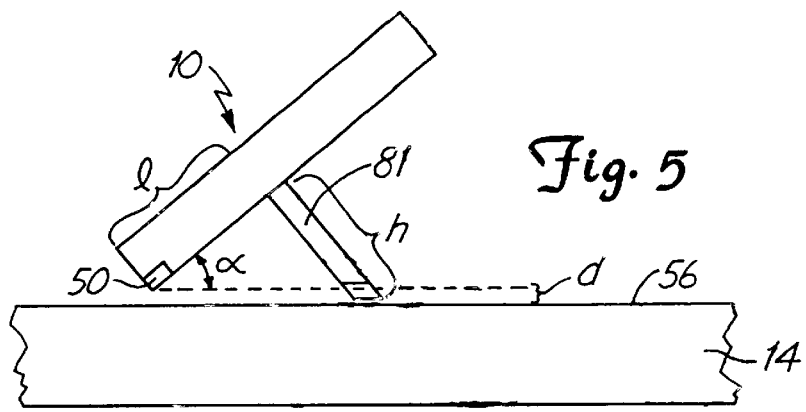
FIG. 5 is a simplified diagram showing a geometrical relation between slider pitch, pad position and pad height.

The operation of slider 10 is illustrated in exaggerated form in FIG. 5. As slider 10 tends to pitch up at the leading edge, the height h and position l from the trailing edge are selected such that h is equal to $\tan(\alpha) \cdot l + d$, where $\alpha$ is the pitch angle and d is small value which provides the separation between the head 50 and the disc surface 56. In the present invention, the height h is decreased as the pad wears until the point is reached at which time the slider is in equilibrium.

Figure 6:
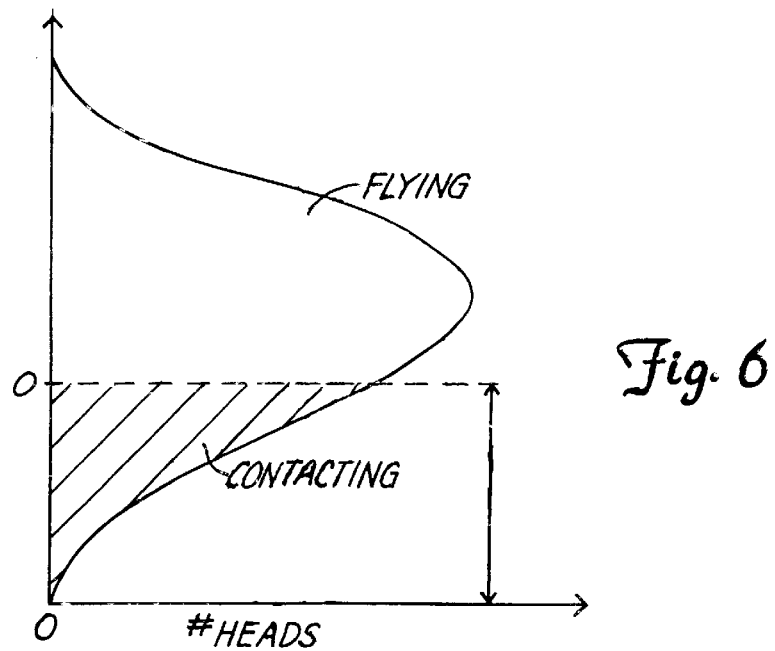
FIG. 6 shows the fly height distribution of typical sliders.

FIG. 6 is a graph showing the distribution of heads relative to fly height from a typical manufacturing process. The present invention is effective when used with those heads which would be in contact with the disc surface. In the prior art, these heads would typically be discarded. With the invention, these heads may be used and the contact pad will compensate for the difference between the lift force from the air bearing and the preload force from the armature. For example, if the preload force is 500 mg and the lift force is 400 mg, the contact force on the pad will be 100 mg. Preferably, the pad will wear to a point where the pad is just slightly touching the disc surface.

The present invention is readily applicable to existing slider designs. The invention does not require accurate fly height control during manufacture. The air bearing can be designed to achieve a net lift in order to accommodate high preload applications such as those required for portable devices. The invention allows a transition from contact technology to flying technology as the pads wear. The heights of the pads are not necessarily the same. For example, the front pads can be designed to be higher to thereby provide additional lift during takeoff so that the contact occurs along the rear pads only. Furthermore, the invention can be extended to include independent air bearing areas which surround each of the pads such that each micro air bearing provides both damping and lift functions.

A slider in accordance with the present invention may be manufactured using known slider formation technologies including additive or subtractive processes, machining, milling, etc. The pads may be formed as integral components or may be deposited separately from the main slider body. Variable pad hardness may be achieved by adding hydrogen to the DLC during fabrication. Further, note that in the present invention the actual contact area, when the slider is contacting the disc surface, is over the relatively small pad area as opposed to over the entire slider surface as in prior art designs. For example, 10,000 microns$^2$.

Although the present invention has been described with reference to preferred embodiments, workers skilled in the art will recognize that changes may be made in form and detail without departing from the spirit and scope of the invention.

What is claimed is:

1. A storage device, comprising:

a storage disc having a disc surface;

a slider means for positioning a transducer proximate the storage disc, the slider means including an interface surface facing the disc surface having an air bearing region adapted to form an air bearing with the disc surface; and contact pad means positioned between the transducer and a leading edge of the slider means, for reaching an equilibrium between a lift force of the slider means and a contact force between the pad means and the disc surface.

2. The storage device of claim 1 wherein a height of the pad means compensates for a difference between a lift force of the slider means and a preload force on the slider means.

3. The storage device of claim 2 wherein the slider means provides an opposed lifting force substantially equal to the preload force minus the contact force acting on the pad means.

4. The storage device of claim 1 including a sacrificial wear layer on the contact pad means.

5. The storage device of claim 4 wherein the sacrificial wear layer comprise a diamond-like coating (DLC).

6. The storage device of claim 1 wherein the contact pad means has a height which wears and reaches equilibrium.

7. The storage device of claim 1 wherein the slider means includes multiple contact pad means.

8. The storage device of claim 7 wherein the contact pad means have more than one height.

9. The storage device of claim 7 wherein contact pad means near a leading edge of slider means has a greater height than contact pad means near a trailing edge of the slider means.

10. The storage device of claim 1 wherein the pad means provides sufficient fly height to protect the transducer from contact with an asperity.

11. The storage device of claim 1 wherein the transducer comprises a magnetoresistive head.

12. The storage device of claim 1 wherein the transducer comprises a magneto-optical head.

13. The storage device of claim 1 wherein an air bearing surface of the slider means comprises a multi-step air bearing surface.

* * * * *